（12） United States Patent
Sterling

(10) Patent No.: US 10,131,323 B1
(45) Date of Patent: Nov. 20, 2018

(54) VEHICLE NOTIFICATION SYSTEM FOR APPROACHING OBJECT DETECTION

(71) Applicant: Gentex Corporation, Zeeland, MI (US)

(72) Inventor: Jacob C. Sterling, Lowell, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/693,869

(22) Filed: Sep. 1, 2017

(51) Int. Cl.
*B60R 25/31* (2013.01)
*B60R 25/01* (2013.01)
*B60R 25/10* (2013.01)

(52) U.S. Cl.
CPC ............. *B60R 25/31* (2013.01); *B60R 25/01* (2013.01); *B60R 25/10* (2013.01); *B60R 2025/1013* (2013.01)

(58) Field of Classification Search
CPC ............. E05Y 2900/55; E05Y 2400/85; E05Y 2400/858; E05Y 2900/542; E05Y 2201/422; E05Y 2201/434; E05Y 2400/44; E05Y 2800/252; E05Y 2800/428; E05Y 2201/22; E05Y 2201/49; E05Y 2201/656; E05Y 2201/724
USPC ......... 340/435, 901, 932.2, 425.5, 436, 903, 340/904, 552, 561, 565, 461
See application file for complete search history.

(56) References Cited

U.S. PATENT DOCUMENTS

| | | | | |
|---|---|---|---|---|
| 5,574,426 A | * | 11/1996 | Shisgal | B60Q 9/007 180/271 |
| 7,149,608 B2 | * | 12/2006 | Itoh | B60Q 9/008 701/1 |
| 9,896,020 B2 | * | 2/2018 | Dellock | H05B 33/0854 |
| 2007/0041169 A1 | * | 2/2007 | Konet | H03K 17/962 362/84 |
| 2009/0212974 A1 | * | 8/2009 | Chiba | B60Q 9/006 340/932.2 |
| 2015/0035685 A1 | * | 2/2015 | Strickland | B60Q 9/008 340/901 |
| 2015/0109444 A1 | * | 4/2015 | Zhang | B60Q 9/008 348/148 |

(Continued)

OTHER PUBLICATIONS

Durbin, Dee-Ann, AP, "New Ford System Helps Warn Police of Approaches," USA Today, Jul. 19, 2013, 4 pages, Web, <https://www.usatoday.com/story/money/cars/2013/07/19/ford-system-warns-police/2568397/>.

(Continued)

*Primary Examiner* — Daniel Previl
(74) *Attorney, Agent, or Firm* — Price Heneveld LLP; Bradley D. Johnson

(57) ABSTRACT

A notification system for a vehicle is disclosed. The system comprises at least one object detection sensor configured to detect an object proximate to the vehicle and communicate a distance signal indicating a distance of the object from the vehicle. The system further comprises a first notification device configured to output a vibrating notification and a controller in communication with the at least one object detection sensor and the first notification device. The controller is configured to identify a first object detection of the approaching object in response to the distance signal indicating that the distance of the object is less than a first predetermined distance. The controller is further configured to activate the first device to output the vibrating notification in response to the first object detection.

20 Claims, 5 Drawing Sheets

(56) References Cited

U.S. PATENT DOCUMENTS

2016/0214535 A1\* 7/2016 Penilla .................. G06Q 20/18
2016/0257248 A1\* 9/2016 Lisseman ............... B60K 37/06

OTHER PUBLICATIONS

Marshall, Aarian, "Dodge's Charger Gives Cops Eyes in the Backs of Their Heads," WIRED, Feb. 11, 2017, 41 pages, Web, <https://www.wired.com/2017/02/dodges-charger-gives-cops-eyes-backs-heads/>.

Hogan, Mack, "Dodge to Use its Parking Tech to Protect Police From Ambush Attacks," CNBC, Feb. 10, 2017, 4 pages, Web, <https://www.cnbc.com/2017/02/10/dodge-to-use-its-parking-tech-to-protect-police-from-ambush-attacks.html>.

"Dodge's New Police Cars Have a Feature That Make Them a Cops Best Friend," Alt Driver, Jul. 27, 2017, 7 pages, Web, <http://altdriver.com/good-guy-bad-guy/dodge-charger-pursuit-cop-car-ambush-sensors/>.

\* cited by examiner

VEHICLE NOTIFICATION SYSTEM FOR APPROACHING OBJECT DETECTION

FIELD OF TECHNOLOGY

The present disclosure generally relates to a notification system for a vehicle and, more particularly, relates to a system configured to detect an object approaching a vehicle.

BACKGROUND OF THE INVENTION

Occupants of parked vehicles may often be distracted or preoccupied with a variety of tasks. Such tasks may particularly be numerous for individuals who work in their vehicles (e.g., security, delivery staff, police, and municipal workers, etc.). The disclosure provides for a notification system configured to alert passengers of idle or parked vehicles approaching objects or persons.

SUMMARY OF THE DISCLOSURE

According to one aspect of the present disclosure, a notification system for a vehicle is disclosed. The notification system comprises at least one object detection sensor configured to detect an object proximate to the vehicle. The object detection sensor is further operable to communicate a distance signal indicating a distance of the object from the vehicle. The notification system further comprises at least one notification device and a controller in communication with the at least one object detection sensor and the at least one notification device. The controller is configured to identify a first object detection of the approaching object in response to the distance signal indicating that the distance of the object is less than a first predetermined distance. In response to the first object detection, the controller is configured to activate the at least one notification device to output a first alert. The controller is further configured to identify a second object detection of the approaching object in response to the distance signal indicating that the distance of the object is less than a second predetermined distance. In response to the second object detection, the controller is further configured to activate the at least one notification device to output a second alert.

According to another aspect of the present disclosure, a security system for an equipped vehicle is disclosed. The system comprises at least one detection sensor configured to detect a neighboring vehicle and an object proximate a perimeter of the equipped vehicle. The system further comprises at least one window controller configured to control a position of a driver side window and a passenger side window of the equipped vehicle. The at least one detection sensor and the at least one window controller are in communication with a controller. The controller comprises an automated window control module configured to detect a neighboring vehicle on a driver side and a passenger side of the equipped vehicle based on the at least one object detection sensor. The automated window control module is further configured to detect an approaching object proximate the equipped vehicle. The automated window control module is configured to control the window controller to position the driver side window in a closed position in response to the at least one detection sensor identifying the neighboring vehicle on the passenger side of the vehicle and the approaching object proximate the perimeter. The automated window control module is further configured to control the window controller to position the passenger side window in the closed position in response to the at least one detection sensor identifying the neighboring vehicle on the driver side of the vehicle and the approaching object proximate the perimeter.

According to yet another aspect of the present disclosure, a notification system for a vehicle is disclosed. The system comprises at least one object detection sensor configured to detect an object proximate to the vehicle and communicate a distance signal indicating a distance of the object from the vehicle. The system further comprises a first notification device configured to output a vibrating notification and a controller in communication with the at least one object detection sensor and the first notification device. The controller is configured to identify a first object detection of the approaching object in response to the distance signal indicating that the distance of the object is less than a first predetermined distance. The controller is further configured to activate the first device to output the vibrating notification in response to the first object detection.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
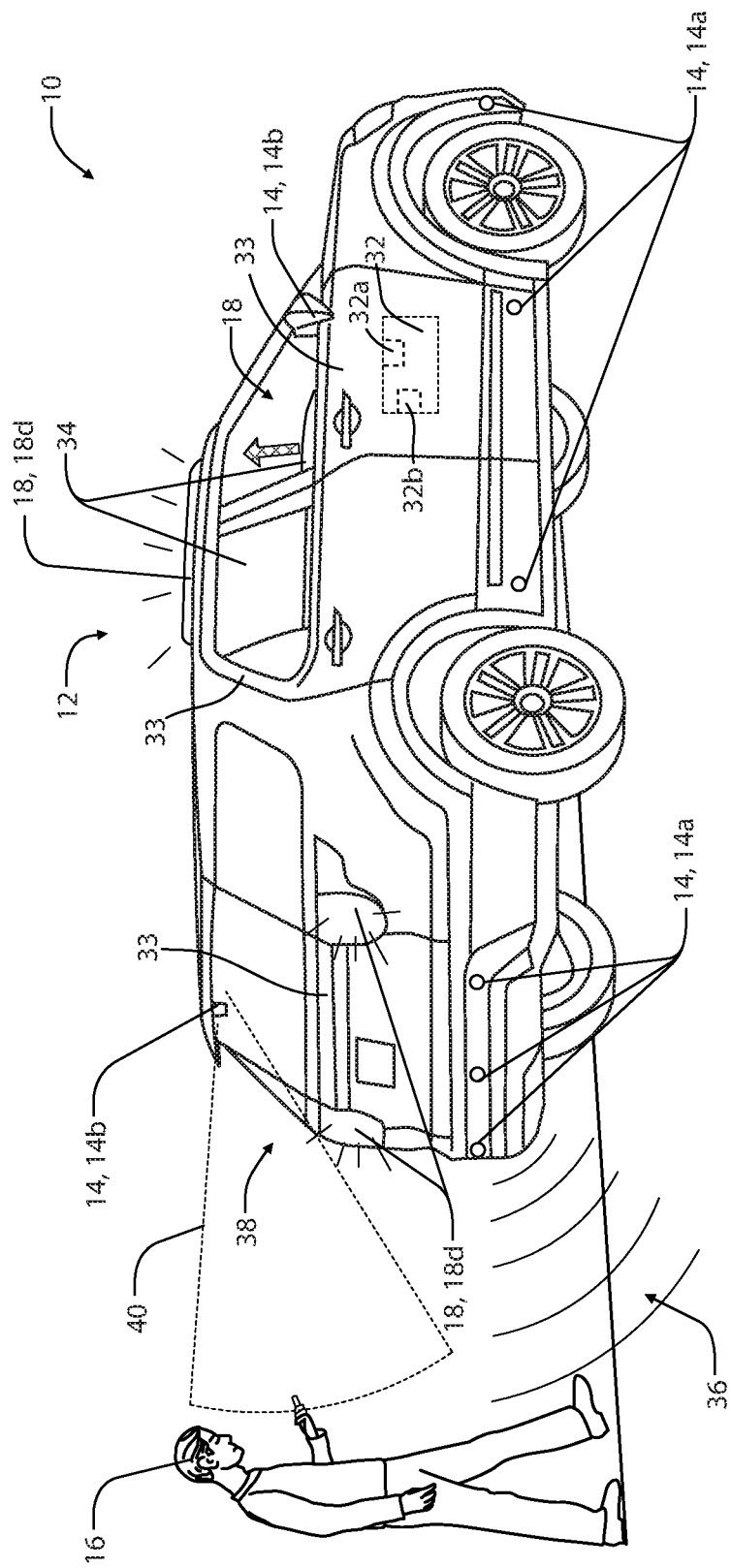
FIG. 1 is an environmental perspective view of a vehicle comprising a notification system.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of a component extending in or along a given direction, or the like, does not mean that the feature or component follows a straight line or axis in such a direction or that it only extends in such direction or on such a plane without other directional components or deviations, unless otherwise specified.

Referring to FIG. 1, a perspective view of a vehicle 10 comprising a notification system 12 is shown. The notification system 12 may comprise at least one object detection sensor 14. As discussed herein, the notification detection system 12 may comprise one or more imaging devices, proximity sensors, and other sensors that may be utilized to detect an object 16 or person approaching the vehicle 10. The object 16 may correspond to a person, animal, vehicle, or various other objects that may be encountered by the vehicle 10. For clarity, the various items that may be detected by the detection sensor 14 may be referred to as objects 16 hereinafter.

Figure 2:
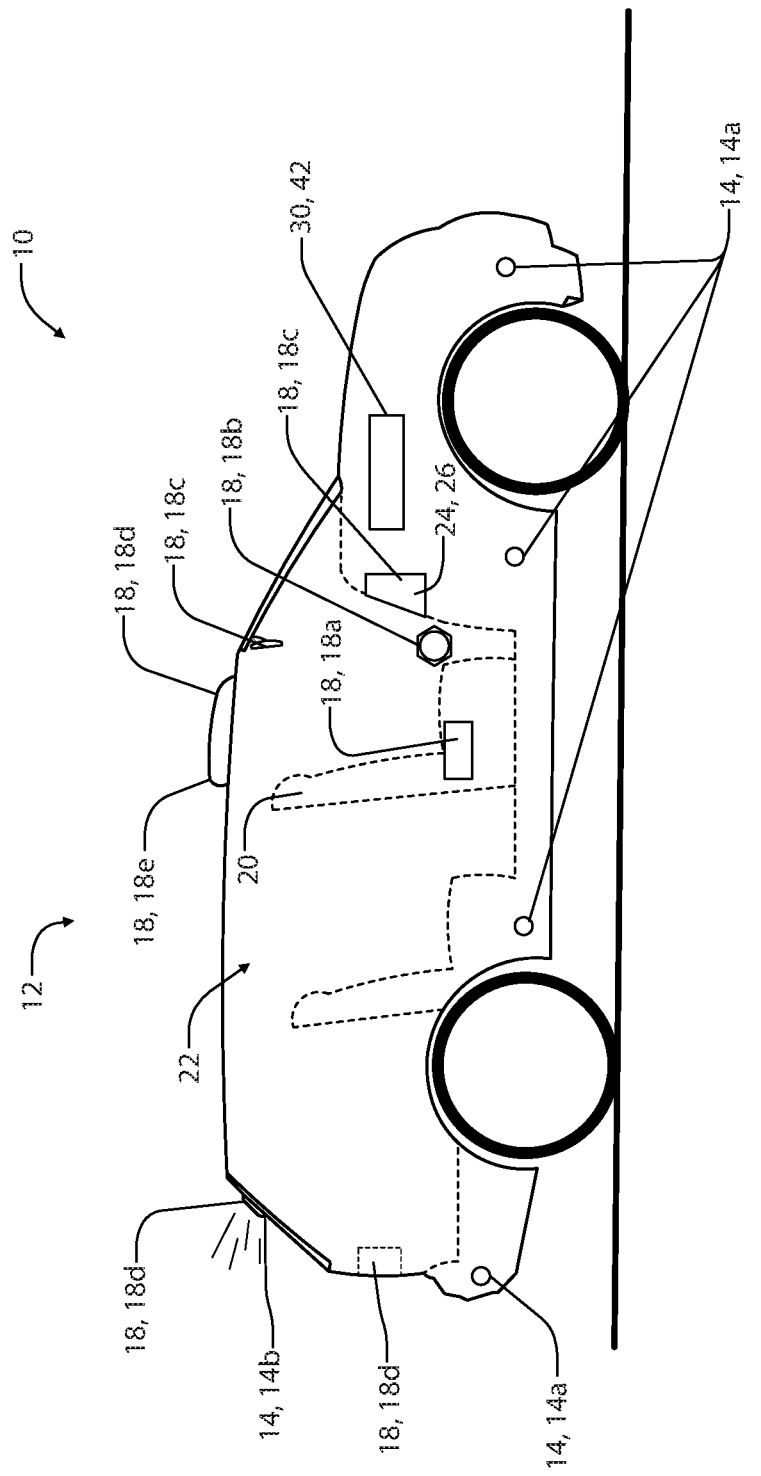
FIG. 2 is a schematic diagram of a vehicle comprising a notification system.

FIG. 2 demonstrates a schematic diagram of the vehicle 10 comprising the notification system 12, which may include one or more notification devices 18. Referring now to FIGS. 1 and 2, in response to the detection of the object 16, the notification system 12 may be configured to activate at least one notification device 18 to alert an occupant of the vehicle 10 to the approaching object 16. The notification devices 18 may include a variety of devices operable to generate vibration or tactile alerts, visual alerts, and/or audible alerts. For example, in some embodiments, a notification device 18 may be disposed in a passenger seat 20. In such embodiments, the notification device 18 may comprise a vibration device 18a, which may be configured to generate and emit a physical vibration or pulse output into the passenger seat 20 such that an occupant may sense the vibration and be alerted to the object 16. In some embodiments, the notification device 18 may correspond to a speaker 18b or display 18c incorporated in a passenger compartment 22 of the vehicle 10. The speaker 18b may form a portion of a stereo or sound system of the vehicle 10. The display 18c may correspond to an information display or user interface 24 of an infotainment system or onboard computer 26 of the vehicle 10. Each of the notification devices 18 may be communicatively connected to a controller 30, which may be configured to detect the object 16 based on one or more signals from the detection sensors 14.

The notification devices 18 may further be configured to output an audible or visual notification from one or more lights 18d or exterior speakers 18e (e.g. sirens) of the vehicle 10. Accordingly, in response to the detection of the object 16 by one or more of the detection sensors 14, the controller 30 may control the lights 18d and/or the exterior speakers 18e to alert the object 16 that the object 16 is approaching the vehicle 10. By outputting the exterior or external alert from vehicle 10, the notification system 12 may provide a warning to the object 16 that the object 16 is approaching a police or law enforcement vehicle, security vehicle, or other vehicles that may be sensitive to approaching objects 16. Accordingly, the notification system 12 may be configured to alert the occupant of the vehicle 10 that the object 16 is approaching as well as notify the object 16 that the vehicle 10 has identified the approach of the object 16.

Still referring to FIGS. 1 and 2, in some embodiments, the notification system 12 may further be in communication with at least one closure controller 32. The closure controller 32 may correspond to a window controller 32a and/or a door position or lock controller 32b. The window controller 32a may be configured to control a drive unit of each of a plurality of windows 34 of the vehicle 10. The door controller 32b may be configured to control a powered locking or closure operation of a plurality of doors 33 of the vehicle 10. In this configuration, the controller 30 of the notification system 12 may be configured to identify the object 16 approaching the vehicle 10. In response to the identification, the controller 32 may control the window controller 32a and/or the door controller 32b to secure the vehicle 10 by positioning one or more of the windows 34 in a closed position and locking the doors 33. Accordingly, the notification system 12 may further provide for an automated operation to secure the vehicle 10 from unauthorized entry.

Figure 3:
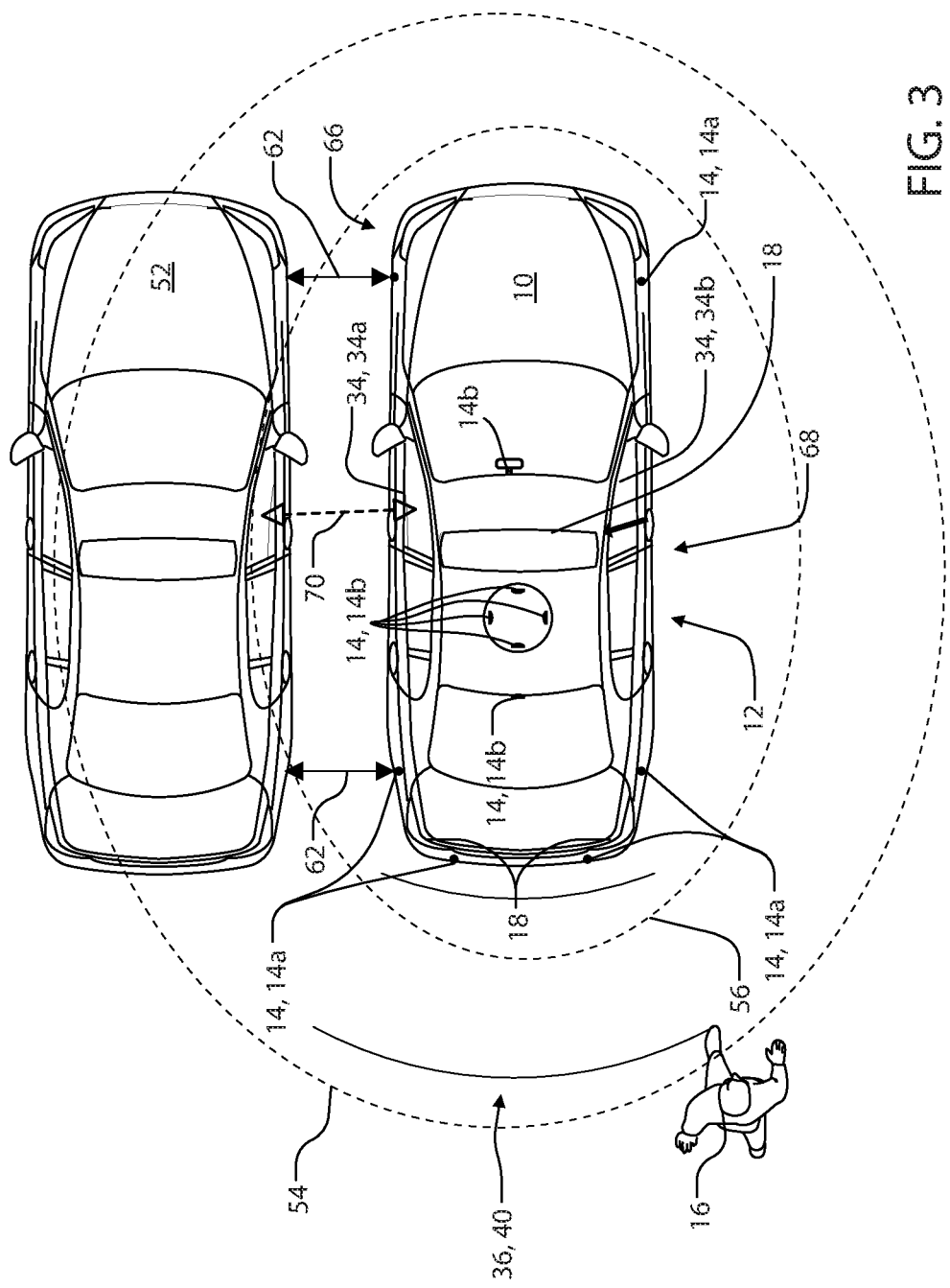
FIG. 3 is a top view of an embodiment of a notification system for a vehicle.

Further examples of a control of the window controller 32a by the notification system 12 are discussed in the reference to FIG. 3.

As discussed herein, the detection sensors 14 may correspond to a variety of forms of sensors operable to detect the object 16 approaching the vehicle 10. For example, in some embodiments, the detection sensors 14 may correspond to a plurality of proximity sensors 14a (e.g., ultrasonic, capacitive, electromagnetic, etc.). The proximity sensors 14a may be operable to detect the object 16 by detecting changes in a detection field 36 proximate a rear portion 38 or around a perimeter of the vehicle 10. In some embodiments, the detection sensors 14 may correspond to image sensors 14b configured to capture image data in a field of view 40 proximate the rear portion 38 or around a perimeter of the vehicle 10. For example, the image sensors 14b may comprise one or more imaging devices comprising optical fields of view configured to capture image data around a perimeter (e.g. a 360-degree view) of the vehicle 10. Accordingly, the notification system 12 may utilize the image data and/or the proximity detection from the detection sensors 14 to accurately identify the object 16 approaching the vehicle 10.

As previously discussed, the notification device 18 may comprise a display 18c in communication with the controller 30. The display 18c may correspond to a touchscreen display which may be utilized as a user interface 24 of the notification system 12. The display 18c may comprise a variety of forms of display technologies, including, but not limited to, liquid crystal displays (LCDs), light-emitting diode (LED) panels, organic LED (OLED) panels, and various forms of display technologies. The touchscreen of the user interface 24 may be enabled by a number of touchscreen technologies, including, but not limited to, resistive, surface acoustic wave, capacitive, infrared grid, optical imaging, dispersive signal, acoustic pulse recognition, etc. Accordingly, the display 18c may provide for a user interface 24 in communication with the controller 30 to control the notification system 12. The display 18c may also be utilized to output a visual alert to the occupant of the vehicle 10 notifying the occupant of the object 16 approaching the vehicle 10.

In some embodiments, the vehicle 10 may be equipped with an onboard computer 26. The onboard computer 26 may also be configured to receive one or more inputs via the user interface 24. Additionally, the onboard computer 26 may comprise one or more communication circuits 42. The onboard computer 26 may be operable to utilize the communication circuits 42 to communicate with a remote server database, central dispatch computer, or various forms of communication links that may support occupational tasks related to the use of the vehicle 10. For example, in some embodiments, the vehicle 10 may correspond to a law enforcement vehicle and the onboard computer 26 may utilize the communication circuit 42 to communicate with a central dispatch operator and/or computer. In this way, the notification system 12 may be integrated and/or utilized with the onboard computer 26 and communication circuits 42 to receive one or more signals from an operator and/or system of a central dispatch unit. In response to the signals from the central dispatch unit, the controller 30 may control the notification system 12 to output one or more notifications to an operator or object 16 approaching the vehicle 10 via the notification devices 18.

In some embodiments, the controller 30 may further be operable to identify the object 16 (e.g. a person, nearby vehicle, etc.) via a secure identification method. For example, the controller 30 may be configured to processing image data from the image sensors 14b or radio signals from the communication circuits 42 to determine an identity or association of the object 16. The identity of the object 16 may correspond to a name of an individual, organizational affiliation, identification credentials, and other information that may be identified by the controller 30 to indicate that the object 16 does not pose a threat to the vehicle 10 or its occupants. The association of the object 16 may be identified by the controller 30 to indicate a membership or affiliation of the object 16 with a law enforcement department, first response team, medical personnel, fire and rescue, municipal affiliation, etc. Accordingly, in response to the identification of the identity or the association of the object 16, the controller 30 may apply one or more specialized control routines to control the windows 34, the doors 33, and/or the notification devices 18.

The identification method processed by the controller 30 to identify the object 16 may comprise an automatic identification and data capture (AIDC) method. For example, in response to detecting the object 16 via the detection sensors 14, the controller may process image data to identify one or more symbols or identifying characteristics of the object 16 indicating an association with a law enforcement agency. More specifically, in some embodiments, the controller 30 may be configured to receive image data from the image sensors 14*b* in order to identify one or more identifying markings or coded symbols on the object 16. Similarly, the controller 30 may be configured to receive one or more coded signals (e.g. coded radio transmissions) via the communication circuits from the object indicating the identity or affiliation of the object 16. In this way, the controller 30 may provide for specific controls to be applied by the system 12 in response to an identified or authenticated object that differ from the controls applied in response to the detection of the object 16 approaching that is unidentified or unauthenticated. Further discussion of the identification of a corresponding identification or authentication of the object 16 is discussed in reference to FIG. 4.

Referring now to FIG. 3, a top plan view of the vehicle 10 is shown demonstrating a notification method for operating the notification system 12. As illustrated in FIG. 3, the vehicle 10 is shown beside a neighboring vehicle 52 and may be referred to as an equipped vehicle 10 for clarity. As previously discussed, in some embodiments, the notification system 12 may utilize the one or more detection sensors 14 to detect the object 16 approaching the equipped vehicle 10. The controller 30 may be operable to receive image data and/or detection signals from the detection sensors 14 and identify a distance signal or range of the object 16 from the equipped vehicle 10. In response to the distance or range of the object 16 from the equipped vehicle 10, the notification system 12 may respond based on a proximity or distance of the object 16 from the equipped vehicle 10.

In some embodiments, a controller 30 of the notification 12 may identify the object 16 at a first predetermined distance 54 and identify a first object detection. In response to the first object detection, the controller 30 may activate one or more of the notification devices 18 to output a first alert. The first alert may correspond to an activation of any one of the notification devices 18 as discussed herein to suit a desired operation of the notification system 12. For example, in response to the first alert, controller 30 may activate the vibration device 18*a*, the speaker 18*b*, and/or the display 18*c* to output an indication of the object 16 approaching the vehicle 10 within the first predetermined distance 54 into the passenger compartment 22 of the vehicle 10.

Additionally, a controller 30 may be configured to identify the object 16 at a second predetermined distance 56 based on one or more signals or image data received from the detection sensor 14. The second predetermined distance 56 may be closer to the equipped vehicle 10 than the first predetermined distance 54. In response to the object 16 identified within the second predetermined distance 56, the controller 30 may identify a second object detection. In response to the second object detection, the controller 30 may activate one or more notification devices 18 to output a second alert. In some embodiments, the second alert may be activated by the controller 30 in the form of a visual or audible alert from an exterior or external portion of the equipped vehicle 10. For example, in response to the second object detection, the controller 30 may control the lights 18*d* or exterior speakers 18*e* to output the second alert such that the object 16 is provided an audible or visible notification that the object 16 is within the second predetermined distance 56 of the equipped vehicle 10. Accordingly, as discussed herein, the notification system 12 may be flexibly applied to alert an occupant of the equipped vehicle 10 via a sensory alert in the passenger compartment 22 and/or emit an exterior alert to the object 16 approaching the equipped vehicle 10.

As previously discussed, the notification system 12 may further be in communication with one or more window controllers 32 of the equipped vehicle 10. In response to the detection of the object 16 based on image data or signals supplied by the detection sensor(s) 14, the controller 30 may control the window controller 32*a* to position a driver side window 34*a* and/or a passenger side window 34*b* of the equipped vehicle 10. For example, in response to the detection of the object 16, the controller 30 may control the window controller 32*a* to position the windows 34 in a closed position. In some embodiments, the notification system 12 may further be operable to detect a neighboring vehicle 52 proximate the equipped vehicle 10. In such embodiments, the controller 30 of the notification system 12 may be configured to independently control the driver side window 34*a* and/or the passenger side window 34*b* based on the detection of the neighboring vehicle 52 proximate the equipped vehicle 10.

The controller 30 of the notification system 12 may be operable to detect the neighboring vehicle 52 based on one or more signals from the detection sensors 14. For example, in some embodiments, the controller 30 may receive signals from the proximity sensors 14*a* identifying a detection 62 of the neighboring vehicle 52 within a close proximity or predetermined distance of the equipped vehicle 10. The close proximity as described herein may correspond to a distance that may be customized based upon a desired operation of the notification system 12. Accordingly, the controller 30 may be operable to detect the neighboring vehicle 52 proximate the equipped vehicle 10 and provide for independent control of each of the driver side window 34*a* and the passenger side window 34*b* based on the detection of the neighboring vehicle 52.

The notification system 12 may also be operable to detect the neighboring vehicle 52 based on image data captured by one or more of the image sensors 14*b*. The image sensors 14*b* may be configured to capture image data in the field of view 40 surrounding the perimeter of the equipped vehicle 10. In some embodiments, the image sensors 14*b* may be configured to capture image data comprising a plurality of fields of view surrounding the equipped vehicle 10. Accordingly, the notification system 12 may also utilize the image data from the one or more image sensors 14*b* to detect the neighboring vehicle 52.

Based on the detection of the neighboring vehicle 52 and/or the detection of the object 16 proximate the equipped vehicle 10, the notification system 12 may be configured to control the driver side window 34a and/or the passenger side window 34b in a variety of ways. For example, in response to detecting the neighboring vehicle 52 on a driver side 66 of the equipped vehicle 10 and a detection of the object 16 within the first predetermined distance 54, the controller 30 may control the window controller 32a to position the passenger side window 34b in a closed position. Additionally, in response to detecting the neighboring vehicle 52 proximate a passenger side 68 and detecting the object 16 within the first predetermined distance 54, the controller 30 may control the window controller 32a to position the driver side window 34a in a closed position.

In yet another scenario, if the notification system 12 does not identify the neighboring vehicle 52 proximately the equipped vehicle 10 and the controller 30 detects the object 16 within the first predetermined distance 54, the controller 30 may control the window controller 32a to position both the driver side window 34a and the passenger side window 34b in the closed position. The independent operation of the windows 34 of the equipped vehicle 10 may provide for an occupant of the equipped vehicle 10 to continue conversing or communicating with an occupant of the neighboring vehicle 52 without being interrupted by the controller 30 closing a window 34a or 34b between the equipped vehicle 10 and the neighboring vehicle 52. The notification system 12 may additionally control one or more of the notification devices 18 to output one or more alerts to the occupant of the equipped vehicle 10 and/or the object 16 approaching the vehicle. The open window of the equipped vehicle 10, as illustrated in FIG. 3, is demonstrated by the arrow 70 for clarity.

Figure 4:
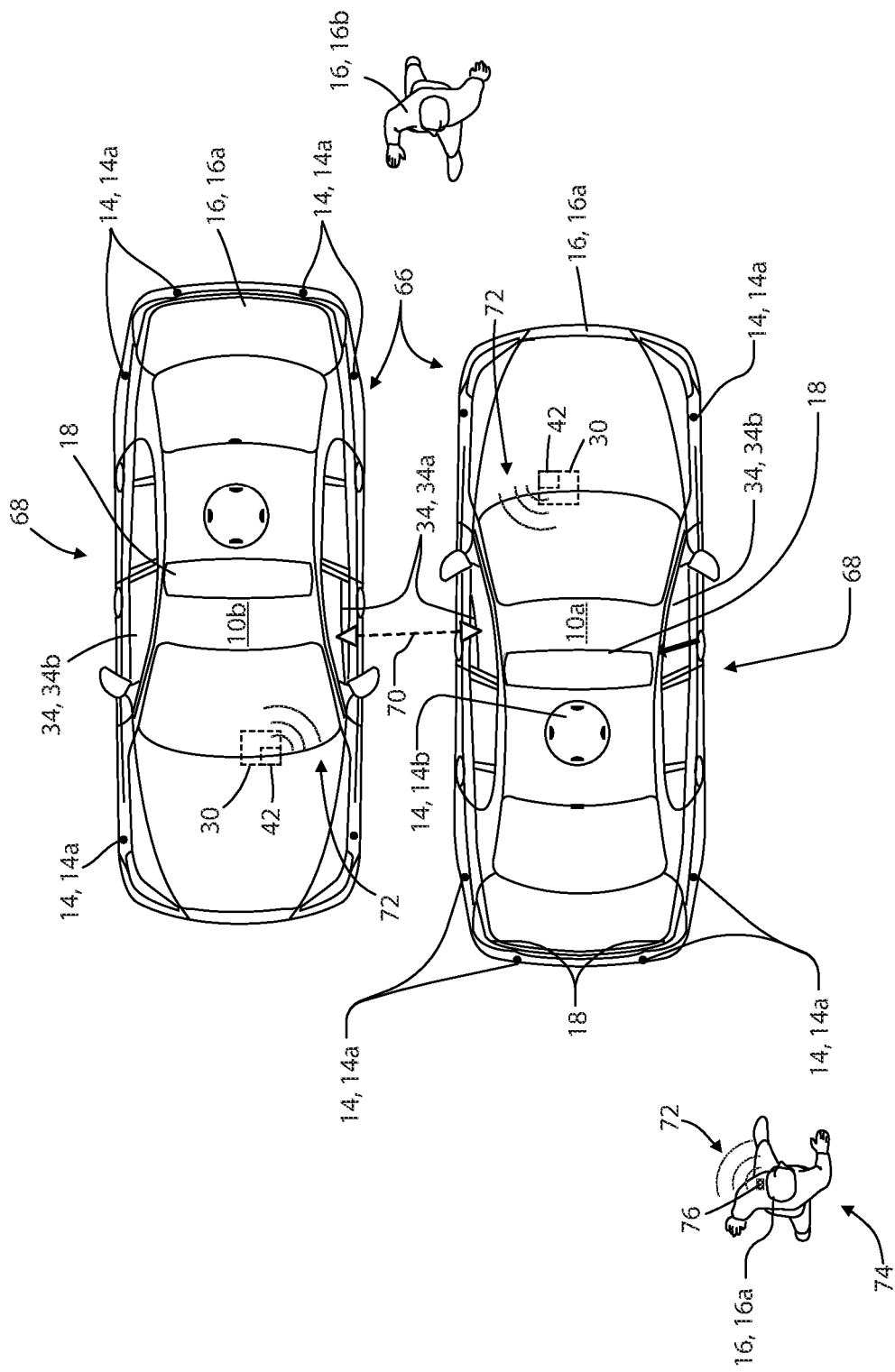
FIG. 4 is a top view of an embodiment of a notification system for a vehicle.

Referring now to FIG. 4, a plurality of equipped vehicles 10 are illustrated and will be referred to as a first equipped vehicle 10a and a second equipped vehicle 10b for clarity. As previously discussed, the equipped vehicles 10 may each comprise the notification system 12. In this configuration, the equipped vehicles 10 may be configured to identify each other via a secure identification method. For example, the controller 30 may be configured to process image data from the image sensors 14b or authentication signals 72 from the communication circuits 42 to determine an identity or association of the object 16. In this way, the controllers 30 of the equipped vehicles 10 may identify each other and apply a specialized control routine to control the windows 34, the doors 33, and/or the notification devices 18.

In some embodiments, the communication circuits 42 of the controllers 30 may be configured to communicate coded signals configured to identify the object 16 as a trusted or affiliated object. For example, the communication circuits 42 of the equipped vehicles 10 may be operable to communicate the authentication signal 72 from the first equipped vehicle 10a to the second equipped vehicle 10b such that each of the controllers 30 can identify the equipped vehicles 10 as trusted or affiliated objects. The affiliation of the object 16 detected by the system 12 may correspond to a name of an individual, organizational affiliation, identification credentials, and other information that may be identified by the controller 30 to indicate that the object 16 does not pose a threat to the equipped vehicle 10 or its occupants. For clarity in terminology, note that the each of the equipped vehicles 10 may be identified as objects 16 by the systems 12 until an identity or affiliation of the equipped vehicles 10 is authenticated by the controller 30. In this way, the controllers 30 of the systems may be configured to identify the objects 16 proximate the equipped vehicle 10 and authenticate an identity of the objects 16 such that the objects 16 are classified by the controller 30 as trusted objects 16a or unidentified objects 16b.

As discussed herein, the controllers 30 of the notification systems 12 may be operable to authenticate or identify an identity or affiliation of the objects 16 proximate to the equipped vehicles 10. Accordingly, each controller 30 may be configured to control the system 12 with a first control routine in response to detecting a trusted object 16a and control the system 12 with a second control routine in response to detecting an unidentified object 16b. For example, in operation, the detection sensors 14 of each of the systems 12 may detect each of the objects 16 shown in FIG. 4. Upon detection of the objects 16, the controller 30 of each of the systems 12 may process image data captured by the image sensors 14b and/or process the authentication signals 72 to determine if the objects 16 are trusted objects 16a or unidentified objects 16b.

As illustrated in FIG. 4, an embodiment of the first control routine is now discussed in detailed reference to the first equipped vehicle 10a. For example, upon detection of the object 16 corresponding to the second equipped vehicle 10b, the controller 30 of the first equipped vehicle 10a may apply the first control routine to control the vibration device 18a to emit a notification of the identification of a trusted object 16a. Accordingly, the controller 30 of the first equipped vehicle 10a may be configured not to emit a notification from the visual or audible notification devices 18 or control a locking or closing operation via the closure controller 30 in response to the identification of the trusted object 16a. However, in response to the identification of the unidentified object 16b, the controller 30 may apply the second control routine to control the notification devices 18 and the closure controller 32 to adjust a position of the windows 34 or lock the doors 33 of the first equipped vehicle 10a. Accordingly, the system 12 may be configured to respond differently based on the detection of the trusted object 16a and the unidentified object 16b. Though described as controlling specific devices or notifications in the first control routine and the second control routine, the controller 30 may be configured to control one or more of the closure controller 32 and the notification devices 18 in a variety of configurations to suit a desired operation of the system 12.

In some embodiments, the system 12 may be operable to identify the trusted object 16a as a trusted person 74 approaching the equipped vehicle 10. For example, the trusted person 74 may comprise an identification module 76. The identification module 76 may correspond to a radio transmitter or radio frequency identification (RFID) device. The communication circuit 42 of the controller 30 may be operable to communicate with the identification module 76 such that the object 16 comprising the identification module 76 may be identified as the trusted person 74 or the trusted object 16a. The communication circuit may identify the trusted object 16a based on the authentication signal 72 communicated from the identification module 76. In this configuration, the controller 30 of the system 12 may be configured to identify the trusted object 16a as a trusted person 74 and apply a first control routine as discussed in reference to the second equipped vehicle 10b. Accordingly, the controller 30 may be configured to control the system 12 to have a first response resulting from the detection of a trusted object 16a and a second response resulting from the detection of an unidentified object 16b.

In some embodiments, the controller 30 may be configured to identify the object 16 based on a security code or radio frequency identification. An example of the identification is discussed herein in reference to the authentication signal 72. The authentication signal 72 may be scanned as an encrypted or coded symbol (e.g., a barcode, QR code, etc.) identified by the controller 30 from image data captured by the image sensors 14*b*. The authentication signal may also correspond to a coded radio frequency signal received by the communication circuit 42. In such embodiments, the identification module 76 may comprise an RFID module. The RFID module of the identification module 76 may comprise a passive reader active tag (PRAT) system, an active reader passive tag (ARPT) system, and/or an active reader active tag (ARAT) RFID system. Similarly, the radio frequency identification may be communicated via a near-field communication (NFC) communication protocol or similar wireless communication protocol effectuated by one or more communication circuits of the identification module 76.

Figure 5:
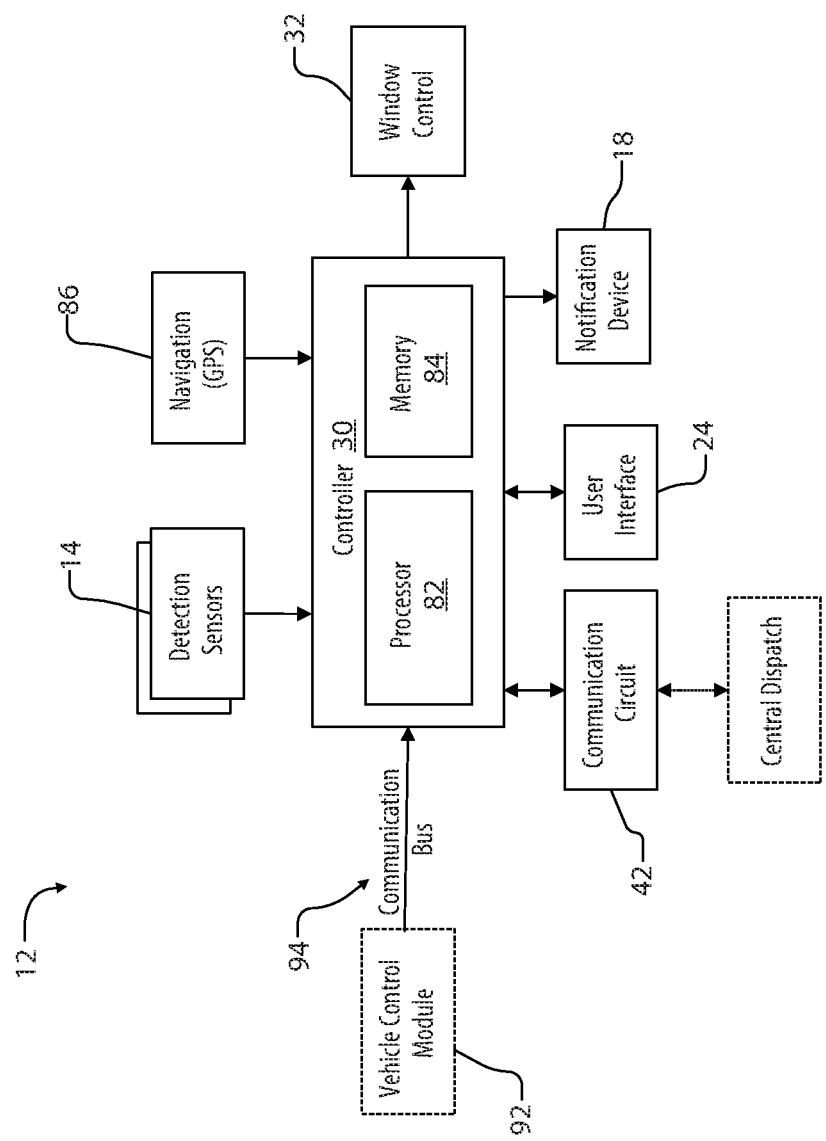
FIG. 5 is a block diagram of a notification system in communication with at least one proximity sensor in accordance with the disclosure.

Referring now to FIG. 5, a block diagram demonstrating the notification system 12 is shown. The notification system 12 may comprise the controller 30. The controller 30 may further comprise a processor 82 and memory 84. The processor 82 may correspond to one or more circuits, processors, microprocessors, application-specific integrated circuits (ASICs) or various other control circuits. The memory 84 may correspond to volatile (e.g., random access memory (RAM)), non-volatile (e.g., read-only memory (ROM)), flash memory, and/or any combination thereof. In this configuration, the controller 30 may provide for the various operations and routines discussed herein.

The controller 30 is in communication with the plurality of detection sensors 14. As previously discussed, the plurality of detection sensors 14 may comprise the proximity sensors 14*a*, one or more image sensors 14*b*, or cameras, or various other sensors that may be operable to detect an object within a predetermined distance or range of the vehicle 10. In some embodiments, the object detection of the detection sensors 14 may operate by generating the detection field 36 or by monitoring image data in the field of view around the perimeter of the vehicle 10. As discussed herein the proximity detection of the object 16 may rely on a variety of sensory technologies, including, but not limited to, capacitive sensors, Doppler effect based sensors, inductive sensors, magnetic sensors, optical sensors, laser sensors, thermal infrared sensors, radar sensors, sonar based sensors, ultrasonic sensors, etc. Accordingly, the detection sensors 14 as discussed herein may be configured to utilize a variety of sensory technologies alone or in combination to achieve the beneficial operations discussed herein.

The communication circuit 42 may be configured to communicate via a variety of communication protocols configured to distribute data among various electronic devices. For example, the communication circuit 42 may be configured to communicate via an IEEE 802.11 connection, an IEEE 802.15 connection, a Bluetooth® connection, a Wi-Fi connection, a WiMAX connection, cellular signal, a signal using Shared Wireless Access Protocol-Cord Access (SWAP-CA) protocol, or any other type of radio frequency (RF) or wireless signal. An IEEE 802.15 connection may include any wireless personal area networks (WPAN), such as ZigBee, Z-Wave, Bluetooth, UWB, and IrDA. In this configuration, the communication circuit 42 may provide for data communication between the onboard computer 26, the central dispatch operator and/or a variety of electronic devices.

The controller 30 may further be in communication with the window controller 32*a*. The window controller 32*a* may be configured to control one or more drive units. The drive units may be configured to control actuators or motors operable to adjust a position of each of a plurality of windows 34 of the vehicle 10. In this configuration, the controller 30 of the notification system 12 may be configured to identify the object 16 approaching the vehicle 10. In response to the identification, the controller 30 may control the window controller 32*a* to position one or more of the windows 34 in a desired position.

In some embodiments, the controller 30 may further be in communication with a location detection device, which may be in the form of a global positioning system (GPS) 86. The GPS 86 may be configured to identify geographic information identifying a location of the vehicle 10. Such information may be used in combination with the identification of the object 16 to adjust a control scheme, detection distance/range, and/or a detection sensitivity applied by the controller 30 to control the notification devices 18 and the window controller 32*a*. For example, in a first geographic region, the controller 30 may be configured to control the vibration device 18*a*, the speaker 18*b*, and/or the display 18*c* to output a first alert into the passenger compartment 22 of the vehicle 10 that the object 16 is approaching the vehicle 10. In a second geographic region, the controller 30 may be configured to control the lights 18*d* or exterior speakers 18*e* to output the second alert such that the object 16 is notified that it is approaching the vehicle 10. Additionally, the notifications or alerts output from the notification devices 18 may vary based on the geographic region in combination with a time of day when the object is detected and/or a distance from the vehicle 10 to the object 16 (e.g. the first predetermined distance 54, second predetermined distance 56, etc.). Similarly, the controller 30 may also control the window controller 32*a* to adjust a position of each of the plurality of windows 34 based on the geographic region of the vehicle 10, the time of day that the object 16 is detected, the distance or range of the object 16 from the vehicle 10, or any combination of the factors discussed herein as being utilized by the controller 30 to control the notification system 12.

In some embodiments, the controller 30 may further be in communication with the user interface 24 disposed within the vehicle 10. The user interface 24 may comprise the display 18*c* configured to display information related to notification system 12. In this configuration, the notification system 12 may prompt an occupant of the vehicle 10 for one or more user inputs configured to control or adjust the activation or sensitivity of the system 12. The display 18*c* may correspond to various forms of display screens (e.g., a liquid crystal display (LCD), light-emitting diode (LED) display, etc.). In some embodiments, the display 18*c* may comprise one or more switches or a touch interface (e.g., a capacitive, resistive, surface acoustic wave, etc.) configured to receive the user inputs discussed herein.

The controller 30 may further be in communication with a control module 92 of the vehicle 10 via a communication bus 94. In this configuration, the controller 30 may receive signals from a variety of vehicle systems and utilize the signals as inputs to control the notification system 12. Accordingly, the controller 30 may be configured to control the notification system 12 based on one or more operating and/or status signals from various systems of the vehicle 10 (e.g. ignition status, a door lock status, a gear selection, an operational status, engine warning, tire pressure warning, etc.). In this way, the controller 30 may utilize operating and/or status signals from various systems of the vehicle 10 to control the notification system 12.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system 12 may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A notification system for a vehicle comprising:
at least one object detection sensor configured to detect an object proximate to the vehicle and communicate a distance signal indicating a distance of the object from the vehicle;
at least one notification device;
a controller in communication with the at least one object detection sensor, the at least one notification device, and a user interface, wherein the controller is configured to:
identify a first object detection of the object approaching the vehicle in response to the distance signal indicating that the distance of the object is less than a first predetermined distance;
activate the at least one notification device to output a first alert in response to the first object detection;
identify a second object detection of the object approaching the vehicle in response to the distance signal indicating that the distance of the object is less than a second predetermined distance;
activate the at least one notification device to output a second alert in response to the second object detection; and
adjust at least one of the first predetermined distance and the second predetermined distance in response to an input to the user interface.

2. The system according to claim 1, further comprising:
a location detection device configured to identify a geographic location of the vehicle.

3. The system according to claim 2, wherein the controller is further configured to:
adjust the sensitivity of at least one of the first alert and the second alert based on the geographic location of the vehicle.

4. The system according to claim 1, wherein the at least one notification device comprises a first notification device and a second notification device.

5. The system according to claim 4, wherein the first notification device is disposed in a passenger compartment of the vehicle and configured to emit an alert into the passenger compartment.

6. The system according to claim 4, wherein the second notification device is configured to emit an alert from the exterior of the vehicle.

7. The system according to claim 4, wherein the controller is further configured to:
activate the first notification device in response to the first object detection; and
activate the second notification device in response to the second object detection.

8. The notification system according to claim 1, wherein adjusting at least one of the first predetermined distance and the second predetermined distance comprises increasing or decreasing at least one of the first predetermined distance and the second predetermined distance thereby changing the sensitivity of the first alert or the second alert.

9. A security system for an equipped vehicle comprising:
at least one detection sensor configured to detect a neighboring vehicle and an object proximate a perimeter of the equipped vehicle;
at least one window controller configured to control a position of a driver side window and a passenger side window;
a controller in communication with the at least one detection sensor and the at least one window controller, wherein the controller comprises an automated window control module configured to:
detect the neighboring vehicle on a driver side and a passenger side of the equipped vehicle based on the at least one object detection sensor;
detect the object proximate the perimeter of the equipped vehicle and control the window controller to:
position the driver side window in a closed position in response to the at least one detection sensor identifying the neighboring vehicle on the passenger side of the vehicle and the object proximate the perimeter; and
position the passenger side window in the closed position in response to the at least one detection sensor identifying the neighboring vehicle on the driver side of the vehicle and the object proximate the perimeter.

10. The security system for the equipped vehicle according to claim 9, wherein the controller is further configured to:
position both the driver side window and the passenger side window in the closed position in response to the at least one detection sensor identifying the object proximate the perimeter while the neighboring vehicle is not detected.

11. The security system for the equipped vehicle according to claim 9, wherein the controller is further configured to:
maintain a position of both the driver side window and the passenger side window in response to the at least one detection sensor identifying the object proximate the perimeter, identifying a first neighboring vehicle on the driver side, and identifying a second neighboring vehicle on the passenger side.

12. The security system for the equipped vehicle according to claim 9, wherein the at least one detection sensor comprises a plurality of proximity sensors.

13. The security system for the equipped vehicle according to claim 12, wherein the plurality of proximity sensors are disposed around the equipped vehicle and configured to detect the object proximate the perimeter.

14. The security system for the equipped vehicle according to claim 9, wherein the at least one detection sensor comprises at least one imager configured to capture image data around a perimeter of the equipped vehicle.

15. A notification system for a vehicle comprising:
at least one object detection sensor configured to detect an object proximate to the vehicle and communicate a distance signal indicating a distance of the object from the vehicle;
a first notification device configured to output a first notification; and
a controller in communication with the at least one object detection sensor and the first notification device, wherein the controller is configured to:
identify a first object detection of the object in response to the distance signal indicating that the distance of the object is less than a first predetermined distance; and
activate the first device to output the first notification in response to the first object detection, wherein the controller is further configured to change a detection distance of the first predetermined distance in response to an input.

16. The notification system according to claim 15, further comprising:
a second notification device configured to output an audible notification; and
wherein the controller is further configured to:
identify a second object detection of the object in response to the distance signal indicating that the distance of the object is less than a second predetermined distance; and
activate the second notification device outputting the audible notification in response to the second object detection.

17. The notification system according to claim 15, further comprising:
a user interface in communication with the controller; and
wherein the controller is further configured to change the detection distance of the first predetermined distance in response to an input to the user interface.

18. The notification system according to claim 15, wherein the controller is configured to change the detection distance by increasing or decreasing the first predetermined distance.

19. The notification system according to claim 15, wherein the controller is further in communication with a location detection device configured to identify a geographic location of the vehicle, and wherein the controller is further configured to:
change the detection distance of the first predetermined distance in response to the geographic location of the vehicle.

20. The notification system according to claim 15, wherein changing the detection distance comprises increasing or decreasing detection distance thereby changing the sensitivity of the first alert.

* * * * *